United States Patent
Winkler et al.

(10) Patent No.: US 9,683,574 B2
(45) Date of Patent: *Jun. 20, 2017

(54) DEBRIS RESISTANT THRUST BEARING ASSEMBLY FOR HIGH SPEED HYDRAULIC CENTRIFUGAL TURBINES AND PUMPS

(71) Applicant: ENERGY RECOVERY, INC., San Leandro, CA (US)

(72) Inventors: Felix Winkler, Oakland, CA (US); Jeffrey Michael Calkins, Petersburg, MI (US)

(73) Assignee: ENERGY RECOVERY, INC., San Leandro, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/468,989

(22) Filed: Aug. 26, 2014

(65) Prior Publication Data
US 2015/0043845 A1 Feb. 12, 2015

Related U.S. Application Data

(63) Continuation of application No. 13/335,102, filed on Dec. 22, 2011, now Pat. No. 8,834,028.

(51) Int. Cl.
*F04D 29/057* (2006.01)
*B23P 11/02* (2006.01)
(Continued)

(52) U.S. Cl.
CPC .......... *F04D 29/057* (2013.01); *B23P 11/025* (2013.01); *F03B 11/063* (2013.01);
(Continued)

(58) Field of Classification Search
CPC ........ F16C 17/02; F16C 32/06; F16C 32/092; F16C 32/0692; B23P 15/003
(Continued)

(56) References Cited

U.S. PATENT DOCUMENTS 2,553,066 A * 5/1951 Southern .................. F04D 9/02
415/144
2,698,584 A * 1/1955 Stelzer .................. F04D 29/146
277/387
(Continued)

FOREIGN PATENT DOCUMENTS

JP 10281094 10/1998
JP 10281094 A * 10/1998 ........... F04D 29/063
(Continued)

*Primary Examiner* — Marcus Charles
(74) *Attorney, Agent, or Firm* — Fletcher Yoder, P.C.

(57) ABSTRACT

A rotating assembly adapted for use in turbines and pumps is provided. The rotating assembly includes a shroud that rotates around a central axis and a disk seated in a recess in the shroud so that the disk rotates with the shroud, the disk being oriented perpendicular to the central axis. The rotating assembly also includes a stationary element in which at least one surface of the disk contacts a fluid so that when the fluid flows under pressure, the surface of the disk resists the generation of drag between the surface and the stationary element of the rotating assembly. A shroud is provided that includes a circular recess with a cavity on an outer perimeter extending away from the fixed assembly. A method of manufacturing a rotating assembly is provided.

14 Claims, 6 Drawing Sheets

(51) Int. Cl.
  *F03B 11/06*  (2006.01)
  *F04D 23/00*  (2006.01)
  *F16C 32/06*  (2006.01)
  *F16C 17/06*  (2006.01)

(52) U.S. Cl.
  CPC ........ *F04D 23/003* (2013.01); *F16C 32/0614* (2013.01); *F16C 17/06* (2013.01); *F16C 32/06* (2013.01); *F16C 32/0692* (2013.01); *F16C 2202/52* (2013.01); *F16C 2206/40* (2013.01); *F16C 2208/36* (2013.01); *Y02E 10/226* (2013.01); *Y02P 70/525* (2015.11); *Y10T 29/49236* (2015.01); *Y10T 29/49645* (2015.01)

(58) Field of Classification Search
  USPC ....... 384/100, 103, 105, 115, 121, 251, 303, 384/307, 316, 907.1; 415/104–107, 146, 415/229; 417/407; 29/898.07, 898.041
  See application file for complete search history.

(56) References Cited

U.S. PATENT DOCUMENTS

| | | | | |
|---|---|---|---|---|
| 2,701,528 A * | 2/1955 | Angell | ................... | F04D 13/04 415/185 |
| 3,563,618 A * | 2/1971 | Ivanov | ................ | F16C 32/0692 384/121 |
| 4,242,039 A * | 12/1980 | Villard | ................ | F04D 29/2266 415/112 |
| 4,355,850 A * | 10/1982 | Okano | .................... | F01D 25/22 384/121 |
| 4,364,717 A * | 12/1982 | Schippers | ............. | F01D 25/125 415/180 |
| 4,376,617 A * | 3/1983 | Okano | .................... | F01D 25/14 415/178 |
| 4,679,984 A * | 7/1987 | Swihart | ................. | F01D 17/165 415/163 |
| 4,786,238 A * | 11/1988 | Glaser | ................... | F01D 25/125 415/175 |
| 4,801,250 A * | 1/1989 | Lammers | .............. | F04B 39/066 137/851 |
| 5,209,652 A * | 5/1993 | Fischer | ................. | F04D 29/041 384/103 |
| 5,529,464 A * | 6/1996 | Emerson | ................... | F04D 1/06 384/106 |
| 5,827,040 A * | 10/1998 | Bosley | ................. | F01D 25/168 415/106 |
| 6,151,909 A * | 11/2000 | Carter | ................... | B64D 13/08 62/402 |
| 6,190,048 B1 * | 2/2001 | Weissert | ............... | F01D 25/166 384/103 |
| 7,614,853 B2 * | 11/2009 | Saville | ..................... | F01D 5/02 384/317 |
| 2006/0034684 A1 * | 2/2006 | Metz | ..................... | F01D 11/003 415/191 |

FOREIGN PATENT DOCUMENTS

SU   1295059        3/1987
SU   1295059 A  *  3/1987  ............. F16C 17/04

* cited by examiner

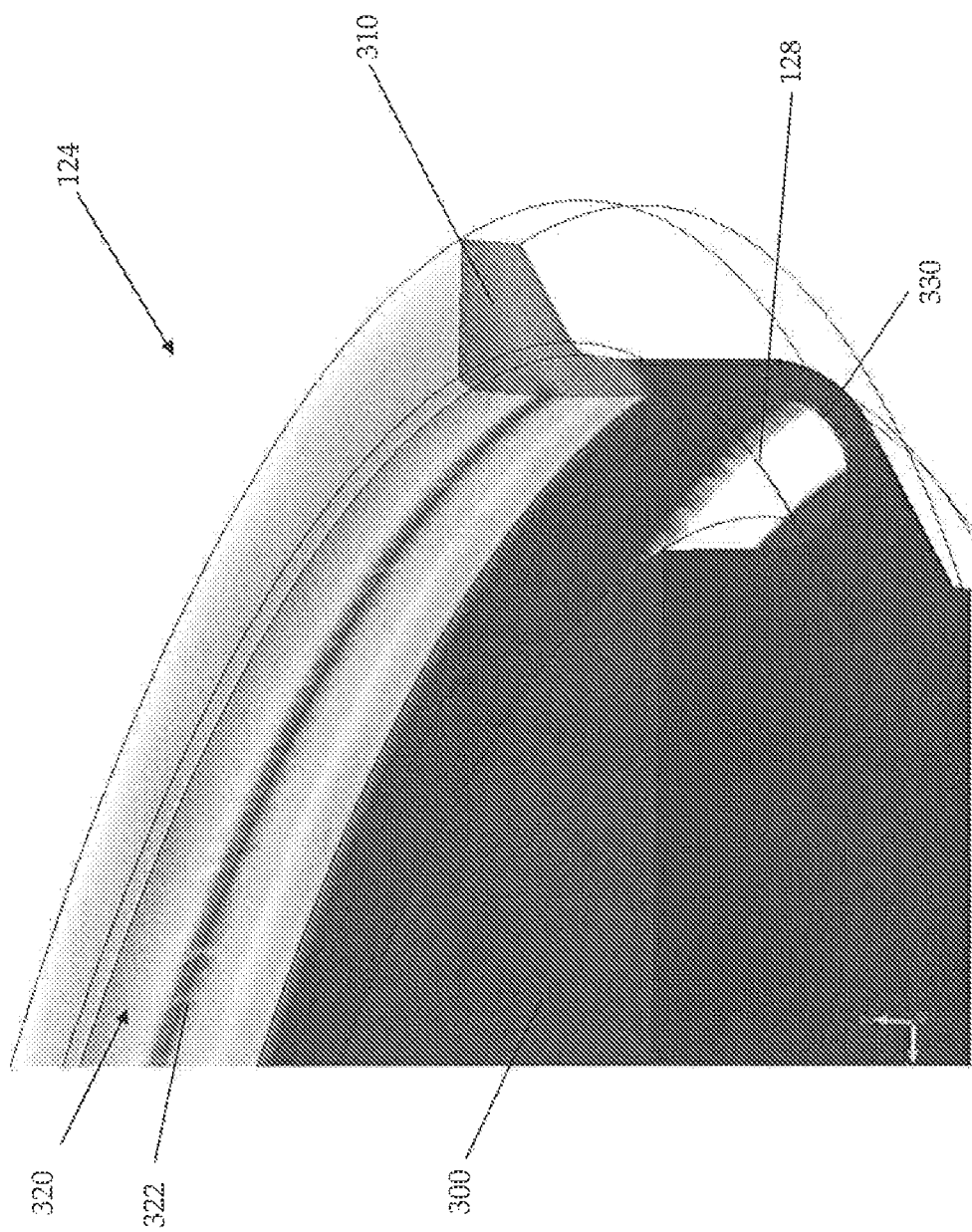

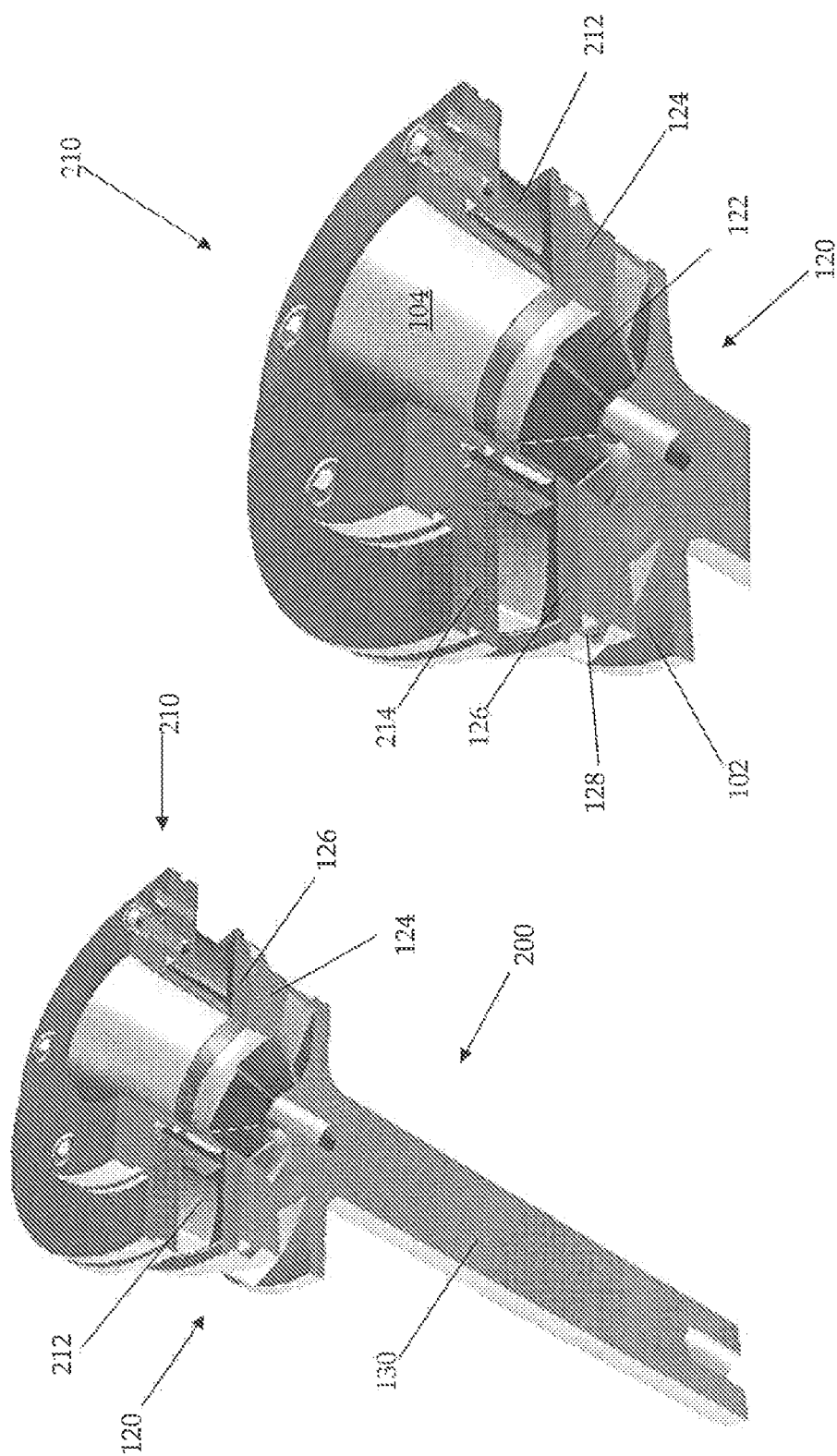

DEBRIS RESISTANT THRUST BEARING ASSEMBLY FOR HIGH SPEED HYDRAULIC CENTRIFUGAL TURBINES AND PUMPS

CROSS-SECTION TO RELATED APPLICATIONS

This application is a continuation of U.S. patent application Ser. No. 13/335,102, entitled "Debris Resistant Thrust Bearing Assembly for High Speed Hydraulic Centrifugal Turbines and Pumps," filed Dec. 22, 2011, which is herein incorporated by reference in its entirety.

FIELD OF THE INVENTION

The present invention relates generally to bearings, and more specifically, to thrust runners for hydrodynamic tilt pads and hydrostatic thrust bearings for turbines and pumps.

BACKGROUND

Turbines and pumps are used for various purposes, and may have similar designs, with the most significant differences being the direction of flow of fluid through the device, and whether the device requires an energy input or provides an energy output. Turbines are used to convert kinetic energy of a fluid to a rotational energy in a shaft. The rotational energy may then be used to perform work, and particularly may be used to generate electricity. Pumps are used to move fluids, and in particular are used to move fluids against a back pressure. In short, pumps convert mechanical energy into hydraulic energy, while turbines convert hydraulic energy into mechanical energy.

One application of a turbine is to recover energy from a natural gas processing operation. Natural gas may have significant quantities of waste gases when recovered from a well, and may need to be cleaned in order to be transported, sold, or used. One method of cleaning natural gas (also referred to as sweetening) is to combine it with water and amine in a high pressure environment. This process allows the separation of the high quality natural gas from the waste gas or gases. After this process, the natural gas may be transported to a lower pressure environment for storage or transport.

Creating the high pressure environment for the cleaning of natural gas is an energy intensive process. The lean amine/water mixture is injected into the high pressure environment (also referred to as a contactor) at high pressure. The contaminant gases (specifically, $CO_2$ and $H_2S$) are then absorbed by the amine/water mixture, and the now rich amine/water mixture flows out of the contactor where its pressure is reduced to atmosphere. Traditionally this is done using a backpressure valve. The present application proposes replacing this valve with a turbine.

Natural gas recovery operations often involve natural gas having a large amount of debris in the gas. Therefore pumps and turbines used in this process must have high tolerances for debris and foreign matter, especially the bearings in pumps and turbines that are process lubricated. Process lubricating pumps and turbines use the same fluid that is flowing through the device to lubricate the pump or turbine.

SUMMARY OF THE INVENTION

According to exemplary embodiments, the present invention provides a thermal fit thrust runner for a thrust bearing. A bearing assembly adapted for use in turbines and pumps is provided. The bearing assembly includes a shroud that rotates around a central axis and a disk seated in a recess in the shroud so that the disk rotates with the shroud, the disk being oriented perpendicular to the central axis. The bearing assembly also includes a stationary element in which at least one surface of the disk contacts a fluid so that when the disk rotates, the surface of the disk resists the generation of drag between the surface and the stationary element of the bearing assembly.

In the bearing assembly, the disk may be annular and/or replaceable. The disk may be installed and secured in the recess by thermal compression. The thermal compression may be accomplished by heating the assembly to a temperature not exceeding 250 degrees Celsius, placing the disk in the recess, and allowing the assembly to cool so that the disk is secured in the recess by a radial force generated by a thermal expansion differential between the shroud and the disk.

The shroud may include stainless steel. The disk may include a ceramic, graphite, and/or metallic carbide. The stationary element may include a ceramic, graphite, polyether ether ketone, and/or metallic carbide. In the bearing assembly, the recess in the shroud may include a cavity proximate to an outer diameter of the recess. The cavity may be U-shaped with parallel sides and an arcuate bottom. An interior surface of the recess between the cavity and the central axis may be substantially planar and perpendicular to the central axis, and the cavity may include parallel sides defining an angle with respect to the interior surface. The angle may be less than or equal to 90 degrees, may be more than 90 degrees, or may be substantially 95 degrees.

The disk may contact the stationary element on a face opposite the recess, and a lubricant may flow between the disk and the stationary element. The lubricant may include a portion of the fluid passing through the turbine or pump.

In an alternative exemplary embodiment, a rotating assembly for contacting a fixed assembly is provided. The rotating assembly is adapted to rotate around a central axis, and includes a shroud including a circular recess. The recess includes on an outer perimeter a cavity extending away from the fixed assembly. The rotating assembly also includes a disk seated in the recess and contacting an outer surface of the recess. The outer surface is substantially parallel to the central axis and compresses the disk when the shroud is at a temperature less than substantially 250 degrees Celsius.

The shroud may be stainless steel, and the disk may include ceramic, graphite, and/or metallic carbide. The fixed assembly may include ceramic, graphite, polyether ether ketone, and/or metallic carbide. The cavity may be Ushaped with parallel sides and an arcuate bottom. The central axis may intersect the recess substantially centrally.

An interior surface of the recess between the cavity and the central axis may be substantially planar and perpendicular to the central axis, and the cavity may include parallel sides defining an angle with respect to the interior surface. The angle may be less than 90 degrees, may be more than 90 degrees, or may be substantially 95 degrees.

The shroud may be coupled to a blade or blades, and the blade or blades may contact a fluid. When the fluid flows under pressure, the blade or blades may urge the shroud to rotate around the central axis.

The disk may contact the fixed assembly on a face opposite the recess, and a lubricant may flow between the disk and the fixed assembly. The lubricant may include a portion of the fluid.

In an alternative exemplary embodiment, a method of manufacturing a rotating assembly is provided. The rotating assembly is used in turbines and pumps. The method includes arranging a disk in a circular recess of a shroud, and securing the disk in the shroud with a radial force between the shroud and the disk caused by thermal compression of the disk by the shroud.

The shroud may include a cavity contiguous with an outer diameter of the recess. The manufacturing method may include, before the arranging operation, heating the shroud to a temperature exceeding 150 degrees Celsius. The disk may not be heated prior to arranging the disk in the recess. Alternatively, the disk may be heated prior to arranging the disk in the recess, and the radial force may be generated by a thermal expansion differential between the shroud and the disk. The thermal compression may be reversible by heating the combination of the disk and the shroud. The manufacturing method may include, before the arranging operation, cooling the disk. The thermal compression may be accomplished by allowing the assembly to warm to room temperature.

BRIEF DESCRIPTION OF THE DRAWINGS

FIG. 3 is a perspective view of an exemplary embodiment of a shroud undergoing a stress analysis according to the present technology.

FIGS. 4A and 4B are cross-sections of an exemplary embodiment of a turbine and thrust bearing assembly according to the present technology.

DETAILED DESCRIPTION OF EXEMPLARY EMBODIMENTS

Figure 1:
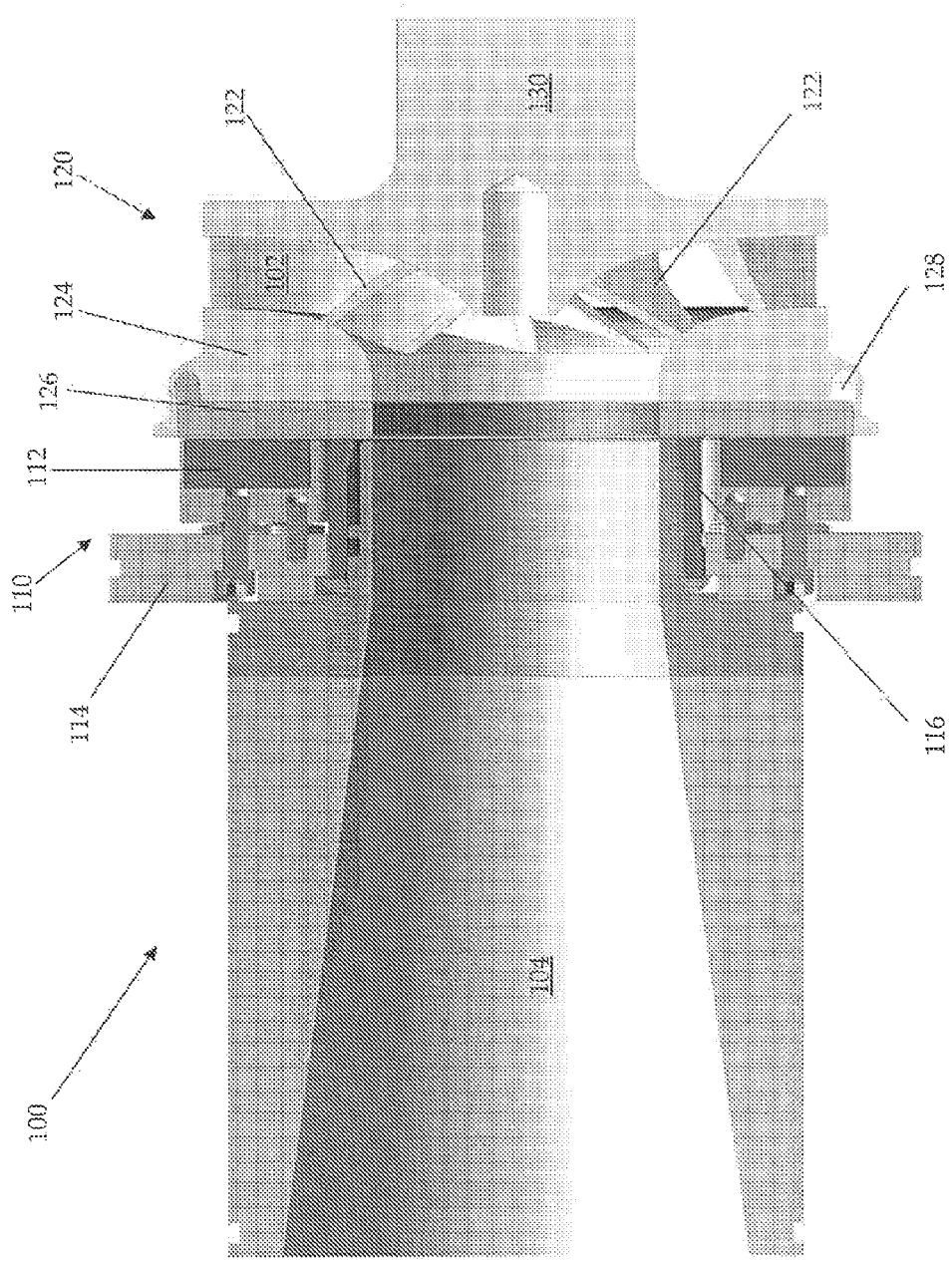
FIG. 1 is a cross-section of an exemplary embodiment of thrust pad bearing according to the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to bearings. More specifically, the present invention provides a thermal fit thrust runner for a bearing of a shroud for a blade or blades for a turbine or pump.

A thrust bearing described herein may be used in a pump or turbine. In a turbine application to recover energy from high pressure natural gas or a water amine mixture after a natural gas sweetening operation, the thrust bearing provided herein may be durable and debris resistant. The thrust bearing may operate at high speeds and may be lubricated by a portion of the fluid flowing through the turbine (or pump), which is also referred to herein as a process lubricated turbine or pump. All of the surfaces in the process lubricated turbine or pump may therefore be wetted surfaces, and therefore tolerant of debris that is common in the fluids associated with a gas sweetening operation. A thrust bearing according to the disclosed technology may be used in any application requiring a debris resistant high speed bearing.

The resistance to wear is provided in the described thrust bearing by a thrust runner, also referred to herein as a disk, which may be ceramic, graphite, or metallic carbide. The thrust runner may be installed in a shroud with a thermal fit that involves installing the thrust runner in the shroud during a high temperature operation. Alternatively, the installation operation may involve cooling the disk. The compression of the thermal fit may strengthen the thrust runner and improve its performance during operation.

FIG. 1 is a cross-section of turbine 100. Alternatively, element 100 may be a pump. Turbine 100 includes inlet channel 102 and diffuser 104. Alternatively, channel 102 may be an outlet and channel 104 may be an inlet, particularly when element 100 is a pump. Turbine 100 includes a thrust pad bearing, which is a combination of fixed assembly 110 and rotating assembly 120.

Fixed assembly 110 includes tilting pad 112, which may be made of silicon carbide or ceramic supported by stainless steel arrangement, or any other appropriate material. Fixed assembly 110 also includes tilting pad bearing base 114, which may be made of stainless steel, or any other appropriate material, and which may be coupled to tilting pad 112 by connectors that may include spring or rocking elements. Fixed assembly 110 further includes mechanical seal 116, which may be made of silicon carbide, tungsten carbide, polyether ether ketone (also referred to as PEEK) or ceramic, or any other appropriate material.

Rotating assembly 120 includes shroud 124, which may be made of stainless steel, or any other appropriate material, and which house blades 122. The portions of shroud 124 that house blades 122 may also be referred to herein and generally as a turbine runner. Blades 122 may in some exemplary embodiments be a single blade, but in alternative and preferred exemplary embodiments, blades 122 are a plurality of blades arranged in a fan configuration. Rotating assembly 120 also includes thrust runner 126, which may be made of silicon carbide or other ceramic, or any other appropriate material, and which may be seated in a recess of shroud 124 in a high temperature assembly operation such that, after cooling, shroud 124 may compress and hold thrust runner 126 in a thermal fit relationship. Shroud may also include cavity 128 adjacent and contiguous with the recess that receives thrust runner 126, and which may remain vacant after thrust runner 126 is seated in the recess.

During operation, fluid under high pressure flows into inlet channel 102 and out diffuser 104, causing blades 122 to rotate. The rotation of blades 122 causes rotating assembly 120 to rotate, which in turn causes shaft 130 to rotate. Rotating assembly 120 may rotate at a high rate of speed due to the high pressure differential between the zone of fluid prior to entry in inlet channel 102 and the zone of fluid after exiting diffuser 104, which may cause the fluid to flow at a high rate of speed. Rotating assembly 120 contacts fixed assembly 110, and this area of contact may experience a high level of force due to the high pressure condition of the fluid upon entering inlet channel 102 relative to the low pressure condition of the fluid upon exiting diffuser 104. The face of thrust runner 126 that faces tilting pad 112 may therefore experience a high level of wear due to the combination of the high pressure, and the high rate of relative rotational velocity, between these two elements.

The present technology provides for convenient and easy replacement of thrust runner 126. Thrust runner 126 may be removed by reversing the installation operation, for example by heating the combination of the thrust runner and shroud 124. Alternatively, thrust runner 126 may be removed by impacting thrust runner 126 so that it breaks. Subsequently, a new thrust runner 126 may be installed in shroud 124 and the combination returned to turbine 100 for continued use.

Figure 2:
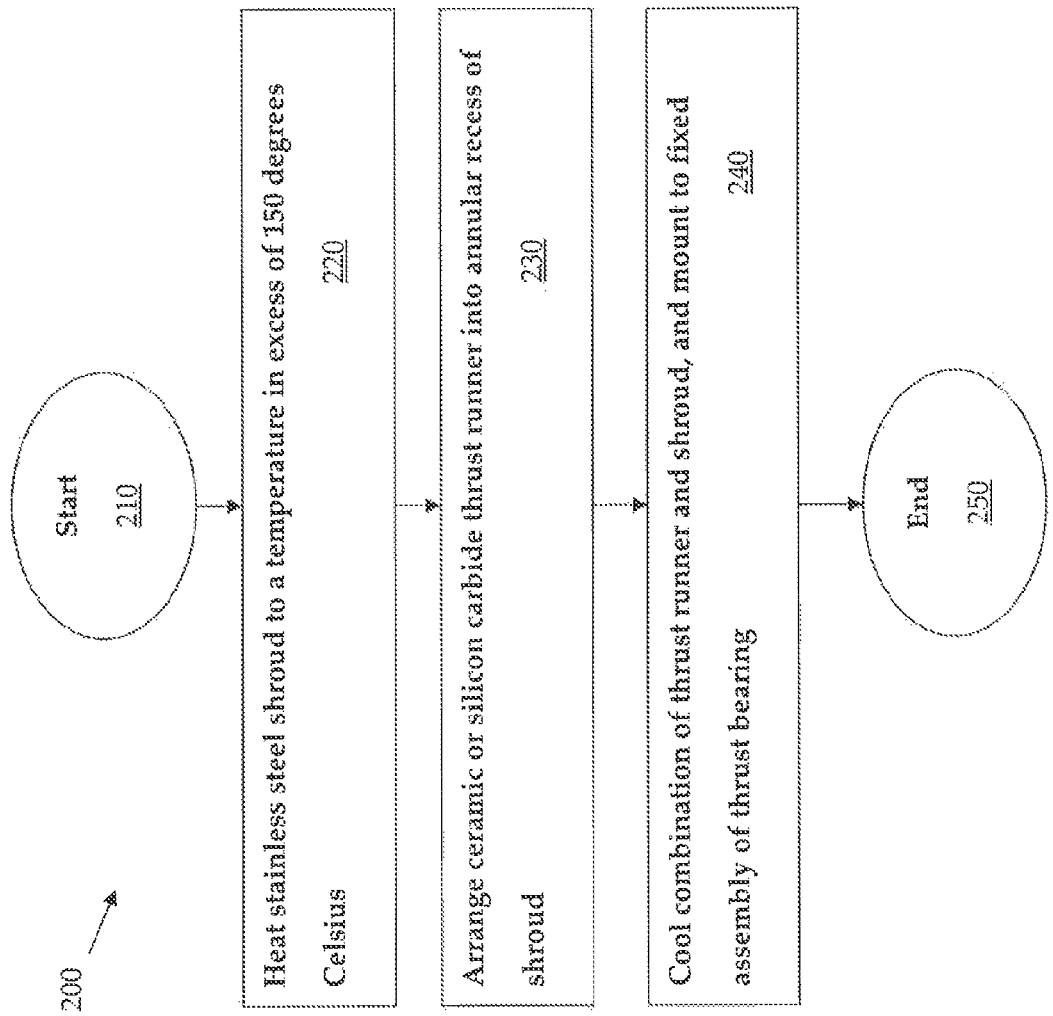
FIG. 2 is a flow chart illustrating an exemplary method according to the present technology.

FIG. 2 illustrates method 200 according to the present technology. Method 200 starts at start oval 210 and proceeds to operation 220, which indicates to heat a stainless steel shroud to a temperature in excess of 150 degrees Celsius. Alternatively, the shroud may be made of any one or more of stainless steel, a ceramic material, graphite, polyether ether ketone, and metal carbide. The shroud may be heated not in excess of 250 degrees Celsius, and the disk may be also be heated along with the shroud during operation 210. From operation 220, the flow proceeds to operation 230, which indicates to arrange a ceramic or silicon carbide thrust runner into an annular recess of the shroud. The thrust runner is also referred to herein as a disk, and may alternatively include one or more of ceramic, graphite, or metallic carbide. From operation 230, the flow proceeds to operation 240, which indicates to cool the combination of the thrust runner and the shroud. Operation 240 further indicates to mount the combination to a fixed assembly of a thrust bearing. The fixed assembly is also referred to herein as a stationary element, and may be composed of one or more of a ceramic, graphite, polyether ether ketone, and metallic carbide. From operation 240, the flow proceeds to end oval 250. In still further alternatives, the disk may be cooled, while the shroud remains at room temperature or is heated, prior to operation 230. In the case where both the shroud and the disk are heated during operation 210, the material for the shroud has a different coefficient of thermal expansion with respect to the material of the disk. In this manner, the thermal fit between the disk and the shroud exists for a range of temperatures that includes the operating range, and the thermal fit would not exist at the manufacturing temperature. Therefore, this thermal fit is reversible by raising the temperature of the combination of the shroud and the disk to the manufacturing temperature and removing the disk from the shroud. This reversal of the manufacturing process may be very useful in situations in which the disk becomes worn and requires replacement.

FIG. 3 is a perspective view of an exemplary embodiment of shroud 124 undergoing a finite element stress analysis, with different shading representing different amounts of stress. Shroud 124 includes cavity 128 along an outer perimeter of the annular recess. Face 300 of shroud 124 defines a position for a thrust runner. When a thrust runner of appropriate size to create a thermal fit (also referred to as a shrink fit) is positioned in the recess of shroud 124 and is compressed by outer face 320 of shroud 124, stress is concentrated at line of contact 322 as well as at arcuate portion 330 of cavity 128. Flange 310 of shroud 124 functions to support line of contact 322, and is under a considerable amount of hoop stress. These stresses are within tolerance (below the yield stress) for the material used for shroud 124, and create a sufficiently strong thermal fit to attach a thrust runner for use in a high speed turbine or pump.

FIG. 4A is a cross-section of an exemplary embodiment of turbine 200 including a thrust bearing having fixed assembly 210 and rotating assembly 120. Rotating assembly 120 is coupled to shaft 130 and includes shroud 124 and thrust runner 126. Thrust runner 126 contacts fixed assembly 210 at tilting pad 212.

FIG. 4B is a cross-section of the exemplary embodiment of turbine 200 shown in FIG. 4A, and additionally illustrates inlet channel 102, diffuser 104, and blades 122. Fixed assembly 210 of turbine 200 illustrated in FIG. 4B also includes tilting pad bearing base 214, and rotating assembly 120 includes thrust runner 126 seated in shroud 124 in a thermal fit relationship. Shroud 124 includes cavity 128. FIGS. 4A and 4B are three-dimensional views of FIG. 1.

Figure 5A:
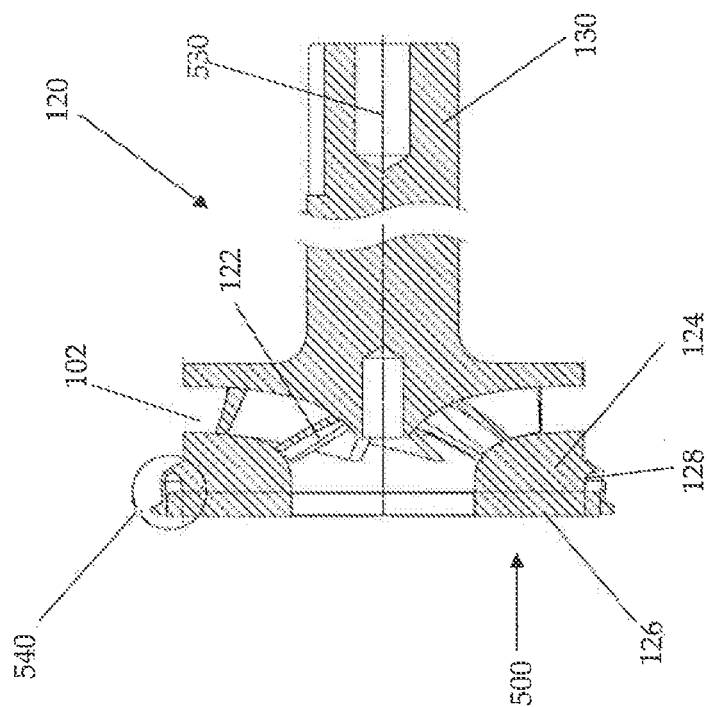
FIGS. 5A, 5B, and 5C are various views of an exemplary embodiment of a shroud and thrust runner combination according to the present technology.
Figure 5B:
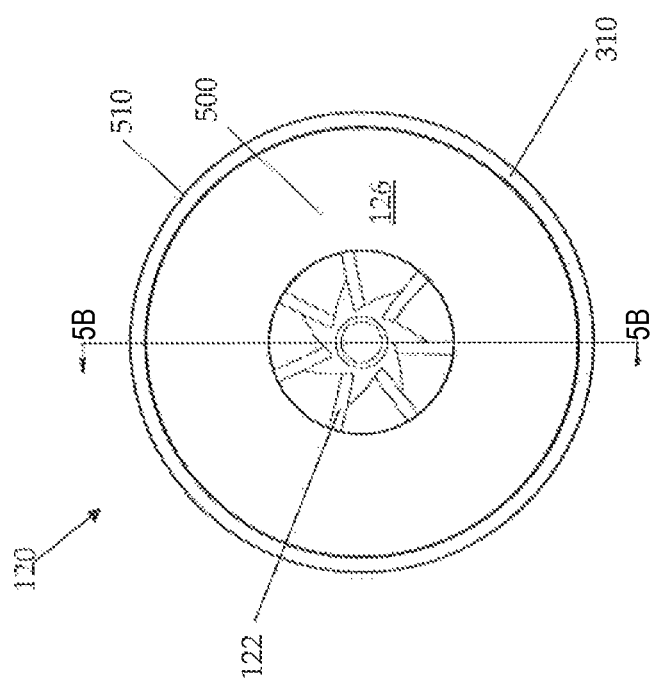

FIG. 5A is a front view of an exemplary embodiment of rotating assembly 120 including blades 122 arranged centrally within annular face 500 of thrust runner 126. On outer perimeter 510 of rotating assembly 120 is flange 310 of a shroud. Cross-sectional line 5B-5B illustrates the section used for FIG. 5B FIG. 5B is cross-sectional view of the exemplary embodiment of shroud 124 and thrust runner 126 of rotating assembly 120. Thrust runner 126 includes face 500 and is seated in shroud 124. Shroud 124 houses blades 122 occupying inlet channel 102 and is rigidly coupled to shaft 130. Also illustrated in FIG. 5B is central axis 530, about which rotating assembly 120 rotates. Shroud 124 includes perimeter zone 540 which is illustrated in more detail in FIG. 5C.

Figure 5C:
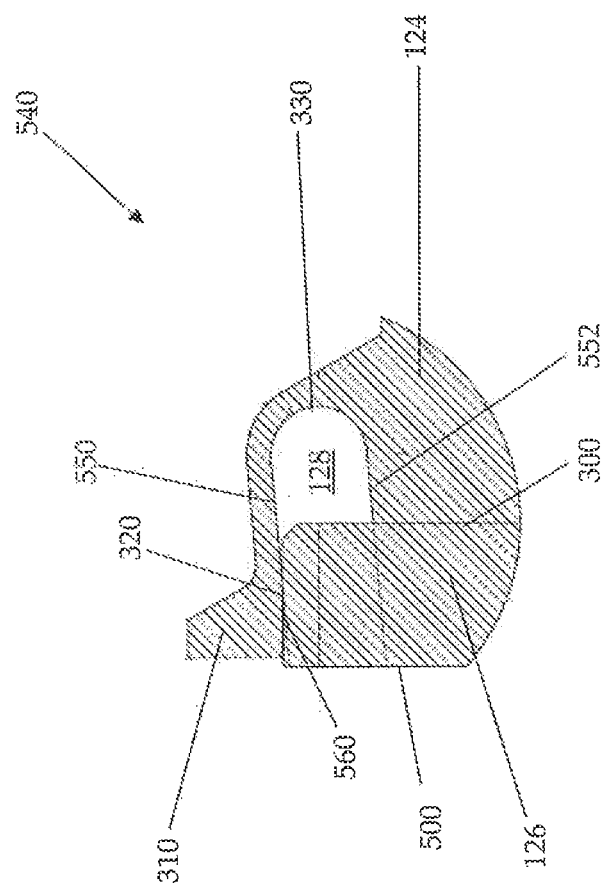

FIG. 5C is a close-up view of perimeter zone 540 including portions of shroud 124 and thrust runner 126. Shroud 124 includes face 300, on which thrust runner 126 seats, and flange 310 on an outer perimeter. Shroud 124 also includes cavity 128 which is not occupied by thrust runner 126 but which is contiguous with the recess occupied by thrust runner 126. Cavity 128 is U-shaped including inward side 552 toward a central axis, and outward side 550 away from the central axis. Arcuate portion 330 forms a bottom of cavity 128. Outward side 550 may be parallel to inward side 552, and may additionally be parallel to a central axis, or equivalently perpendicular to face 500 of thrust runner 126. Alternatively, outward side 550 and inward side 552 may form an angle of varying degrees with face 500, for example more or less than substantially 90 degrees. In particular, outward side 550 and inward side 552 may angle away from the central axis by 5 degrees, or may angle towards the central axis by 5 degrees. Outer diameter 560 of thrust runner 126 contacts outer face 320 of shroud 124, which together represent the area of interference where the thermal fit engages.

The stainless steel used in the devices and methods according to the present technology may include 2205 and 2507 stainless steels, which have a 50% higher yield strength than 316 stainless steel.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A bearing assembly configured for use in turbines and pumps, the bearing assembly comprising:
    a shroud that is configured to rotate around a central axis;
    at least one blade housed within the shroud;
    a disk seated in a recess in the shroud so that the disk is configured to rotate with the shroud, the disk being oriented perpendicular to the central axis; and
    a stationary element that contacts the disk on a face opposite the shroud, wherein a fluid is configured to flow between the stationary element and the disk so that when the disk rotates, the disk resists the generation of drag between the face of the disk and the stationary element of the bearing assembly.

2. The bearing assembly of claim 1, wherein:
    the disk is annular; and
    the disk is replaceable.

3. The bearing assembly of claim 1, wherein the disk is installed and secured in the recess by thermal compression.

4. The bearing assembly of claim 3, wherein the thermal compression is accomplished by heating the shroud to a temperature exceeding 150 degrees Celsius, placing the disk in the recess, and allowing the assembly to cool so that the disk is secured in the recess by a radial force between the shroud and the disk.

5. The bearing assembly of claim 4, wherein:
the disk is heated prior to placing the disk in the recess; and
the radial force is generated by a thermal expansion differential between the shroud and the disk.

6. The bearing assembly of claim 3, wherein the thermal compression is accomplished by cooling the disk, placing the disk in the recess, and allowing the assembly to warm to room temperature so that the disk is secured in the recess by a radial force between the shroud and the disk.

7. The bearing assembly of claim 1, wherein the shroud comprises stainless steel.

8. The bearing assembly of claim 1, wherein the disk comprises at least one of a ceramic, graphite, and metallic carbide.

9. The bearing assembly of claim 1, wherein the stationary element comprises at least one of a ceramic, graphite, and metallic carbide.

10. The bearing assembly of claim 1, wherein a portion of the recess remains vacant when the disk is seated in the recess.

11. A bearing assembly configured for use in turbines and pumps, the bearing assembly comprising:

a shroud configured to rotate around a central axis;
a disk seated in a recess in the shroud so that the disk is configured to rotate with the shroud, wherein the disk comprises a first face and a second face opposite from the first face, wherein a first portion of the first face of the disk is configured to contact a second portion of an outer face of the shroud, and wherein the recess comprises a cavity disposed between a third portion of the first face of the disk and a fourth portion of the outer face of the shroud; and
a stationary element that contacts the second face of the disk, wherein a fluid is configured to flow between the stationary element and the disk so that when the disk rotates, the disk resists the generation of drag between the face of the disk and the stationary element of the bearing assembly.

12. The bearing assembly of claim 11, wherein the fourth portion of the outer face of the shroud comprises:
first and second surfaces extending away from the third portion of the first face of the disk; and
an arcuate surface extending between the first and second surfaces.

13. The bearing assembly of claim 11, wherein the disk and the cavity are annular.

14. The bearing assembly of claim 11, comprising at least one blade housed within the shroud.

* * * * *